(12) United States Patent
Nilsson et al.

(10) Patent No.: US 9,487,952 B2
(45) Date of Patent: Nov. 8, 2016

(54) SOUND ABSORBING MODULE AND A SUSPENDED CEILING COMPRISING THE SAME

(71) Applicant: Saint-Gobain Ecophon AB, Hyllinge (SE)

(72) Inventors: Erling Nilsson, Lund (SE); Jan Wilkens, Höganäs (SE)

(73) Assignee: Saint-Gobain Ecophon AB, Hyllinge (SE)

( * ) Notice: Subject to any disclaimer, the term of this patent is extended or adjusted under 35 U.S.C. 154(b) by 0 days.

(21) Appl. No.: 14/438,605

(22) PCT Filed: Oct. 22, 2013

(86) PCT No.: PCT/EP2013/072007
§ 371 (c)(1),
(2) Date: Apr. 24, 2015

(87) PCT Pub. No.: WO2014/064065
PCT Pub. Date: May 1, 2014

(65) Prior Publication Data
US 2015/0275516 A1    Oct. 1, 2015

(30) Foreign Application Priority Data
Oct. 24, 2012 (EP) .................................... 12189737

(51) Int. Cl.
E04B 1/86    (2006.01)
E04B 9/00    (2006.01)
E04B 9/04    (2006.01)
E04B 9/30    (2006.01)
(Continued)

(52) U.S. Cl.
CPC ............... *E04B 9/001* (2013.01); *B32B 9/047* (2013.01); *B32B 17/067* (2013.01); *E04B 1/84* (2013.01); *E04B 9/0428* (2013.01); *E04B 9/303* (2013.01);
(Continued)

(58) Field of Classification Search
CPC ........................................................ E04B 1/86
USPC ......................................................... 181/290
See application file for complete search history.

(56) References Cited

U.S. PATENT DOCUMENTS 3,384,199 A * 5/1968 Eckel ............................ 181/290
4,630,707 A * 12/1986 Yukawa ........................ 181/288
(Continued)

FOREIGN PATENT DOCUMENTS

DE    2825173 A1    12/1979
EP    1 260 645 B1    7/2005
(Continued)

OTHER PUBLICATIONS

International Search Report and Written Opinion mailed Feb. 11, 2014, issued in corresponding International Application No. PCT/EP2013/072007, filed Oct. 22, 2013, 6 pages.

*Primary Examiner* — Forrest M Phillips
(74) *Attorney, Agent, or Firm* — Christensen O'Connor Johnson Kindness PLLC

(57) ABSTRACT

The present invention concerns a sound absorbing module (2) for a suspended ceiling (1), comprising a sound absorbent element (6) and a front cover (7). Said front cover (7) is arranged at a distance from the sound absorbent element (6), and according to the present invention the front cover (7) has a flow resistance within the range of 200 to 800 Pas/m. The present invention further concerns a suspended ceiling (1) comprising said sound absorbing module (2).

13 Claims, 6 Drawing Sheets

(51) Int. Cl.
  *B32B 9/04*   (2006.01)
  *B32B 17/06*  (2006.01)
  *E04B 1/84*   (2006.01)

(52) U.S. Cl.
  CPC ...... *B32B 2307/102* (2013.01); *B32B 2419/00* (2013.01)

(56) References Cited

U.S. PATENT DOCUMENTS

| | | | |
|---|---|---|---|
| 7,798,287 | B1* | 9/2010 | Surace et al. ................. 181/290 |
| 2005/0211500 | A1* | 9/2005 | Wendt et al. ................. 181/295 |
| 2005/0263346 | A1* | 12/2005 | Nishimura ................. 181/290 |
| 2006/0157297 | A1* | 7/2006 | D'Antonio ................. 181/287 |
| 2012/0285767 | A1* | 11/2012 | Meyer et al. ................. 181/286 |
| 2013/0118831 | A1* | 5/2013 | Kawai et al. ................. 181/290 |
| 2013/0206503 | A1* | 8/2013 | Kray et al. ................. 181/292 |
| 2014/0060965 | A1* | 3/2014 | Polonen ................. 181/292 |
| 2014/0353079 | A1* | 12/2014 | Gimpel et al. ................. 181/290 |

FOREIGN PATENT DOCUMENTS

| | | |
|---|---|---|
| EP | 1 630 311 A2 | 3/2006 |
| GB | 1496663 A | 12/1977 |

* cited by examiner

SOUND ABSORBING MODULE AND A SUSPENDED CEILING COMPRISING THE SAME

FIELD OF THE INVENTION

The present invention relates to a sound absorbing module. More specifically, the present invention relates to an improved sound absorbing module for suspended ceiling arrangements, and a suspended ceiling comprising such a sound absorbing module.

BACKGROUND ART

A typical suspended ceiling arrangement comprises a plurality of rectangular ceiling tiles which are supported by a supporting structure which often is comprised of inverted T-profiles forming a grid. The supporting structure, in turn, is preferably mounted in a main ceiling of a room or an accommodation in which the suspended ceiling is to be installed.

Moreover, the undersides of the grid of T-profiles may be exposed or concealed. Often, parts of the grid are exposed, being visible from below the suspended ceiling, while other parts are concealed. One way to conceal the undersides of the T-profiles, thereby increasing the aesthetical characteristics of the suspended ceiling, is to arrange parts of the T-profile within kerfs of the ceiling tile.

Commonly, it is desirable that the ceiling tiles are demountable from the suspended ceiling. In particular, easily demountable ceiling tiles are convenient when a quick access to the plenum space, which is formed between the suspended ceiling and the main ceiling, is required. For instance, this may happen when a wire, a pipe or a heating, ventilation or air-conditioning device placed in the plenum space needs to be maintained or repaired.

Sometimes it is important that the ceiling tiles comprised in the suspended ceiling are securely kept in position in the event of voluntary or involuntary forces being applied to them. These forces may be induced by e.g. an earthquake, a cleaning process the ceiling tiles, a sudden change of air pressure in the room caused by an abruptly opened or closed door, etc.

The suspended ceiling may have sound absorbing as well as sound attenuating properties for improving the sound environment inside as well as outside of the room or accommodation.

EP1260645B1 discloses a ceiling slab comprising a frame, a slab-shaped body made of a sound-damping material and a cover. The slab-shaped body is adapted to the frame and placed in positive contact therein, and the thickness of the frame is greater than the thickness of the slab-shaped body. The cover spans the slab-shaped body at a distance and runs on the upper side of the frame and/or the lower outer side of the frame. The cover may be made of plastic material, e.g. PVC-film, but may also be made of textile material or any other efficient material.

Nevertheless, the ceiling slab according to EP1260645B1 may further be improved concerning acoustic behaviour.

SUMMARY OF THE INVENTION

It is therefore an object of the present invention to provide an improved sound absorbing module for suspended ceiling arrangements.

It is a further object of the present invention to provide a sound absorbing module which is adapted to provide optimized/maximized absorption coefficient at sound frequencies of 125 to 4000 Hz, and especially within an office environment by absorbing the information carrying part of speech at a frequency within the range of 250 to 2000 Hz.

These objects are achieved, in full or at least in part, by a sound absorbing module for a suspended ceiling, comprising a sound absorbent element and a front cover. Said front cover is arranged at a distance from the sound absorbent element, and according to the present invention the front cover is air permeable with a flow resistance within the range of 200 to 800 Pas/m.

By arranging a front cover at a distance from the sound absorbent element and having a front cover with a flow resistance within the range of 200 to 800 Pas/m, an optimized absorption coefficient is provided at sound frequencies of 125 to 4000 Hz.

The sound absorbent element is arranged for absorbing sound energy when sound waves collide with it. Especially, the sound absorbent element is arranged for absorbing sound energy when sound waves having passed through the front cover collide with it. The present invention further concerns a suspended ceiling comprising a sound absorbing module of the type according to the present invention and a grid of profiles forming a frame which engages said sound absorbing module.

In one embodiment of the present invention said front cover has a flow resistance within the range of 300 to 500 Pas/m.

By providing a front cover with a flow resistance within the range of 300 to 500 Pas/m an especially optimized absorption coefficient is provided at sound frequencies of 250 to 2000 Hz.

In one embodiment said front cover comprises a glass fibre material. Other examples of front cover comprise porous type material, such as fibres material (natural fibres, man-made fibres), yarn, fabric structures (knitted fabrics, woven fabrics, nonwoven fabrics) or compound fabric structures.

In a further embodiment the distance between the sound absorbent element and the front cover is within the range of 20 to 60 mm, and in another embodiment the distance is within the range of 30 to 50 mm.

In yet another embodiment the sound absorbing module further comprises a frame, which supports the sound absorbent element and which is adapted for mounting said front cover.

In a further embodiment the sound absorbing module further comprises means for slack free mounting of said front cover.

In even a further embodiment said sound absorbent element comprises mineral wool material. The mineral wool material may comprise stone wool, glass wool or both.

In one embodiment the sound absorbing module comprises at least one diffraction element for breaking up and scattering sound waves. Such one or more diffraction elements are arranged in the space defined between said sound absorbent element and said front cover. The at least one diffraction element is provided to break up and scatter sound waves to thereby increase the probability for absorption thereof by the sound absorbent element. Even though the diffraction elements cover a part of a surface of the sound absorbent element, an improvement in absorption coefficient is provided with such an arrangement.

In a further embodiment said at least one diffraction element is arc shaped.

In one embodiment one or more diffraction elements are arc formed baffle walls arranged to form an arc extending from an inner surface of the front cover towards a surface of the sound absorbent element. In one embodiment one or more diffraction elements are arc formed baffle walls arranged to form an arc extending from the sound absorbent element towards an inner surface of the front cover. In one embodiment the arc formed baffle walls are arranged in each outer border of the sound absorbing module, where the arc extends from a border edge of the sound absorbing module towards a surface of the sound absorbent element forming a concave surface from an inner surface of the front cover towards a surface of the sound absorbent element.

In another embodiment the sound absorbent element has a non-planar surface facing said front cover. By having such a non-planar surface a larger sound absorbent surface is provided. By providing a sound absorbent surface with different orientation, the probability of absorbing sound waves entering the front cover increases.

In even another embodiment the frame is lined with sound absorbent material, also contributing to a larger sound absorbing surface as well as a different orientation of absorbent surface.

In a further embodiment said sound absorbent element is a ceiling tile with a painted front surface.

Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of said element, device, component, means, step, etc., unless explicitly stated otherwise.

BRIEF DESCRIPTION OF THE DRAWINGS

The above, as well as additional objects, features and advantages of the present invention, will be better understood through the following illustrative and non-limiting detailed description of different embodiments of the present invention, with reference to the appended drawings, where the same reference numerals will be used for similar elements, wherein.

DESCRIPTION OF EMBODIMENTS

Figure 1:
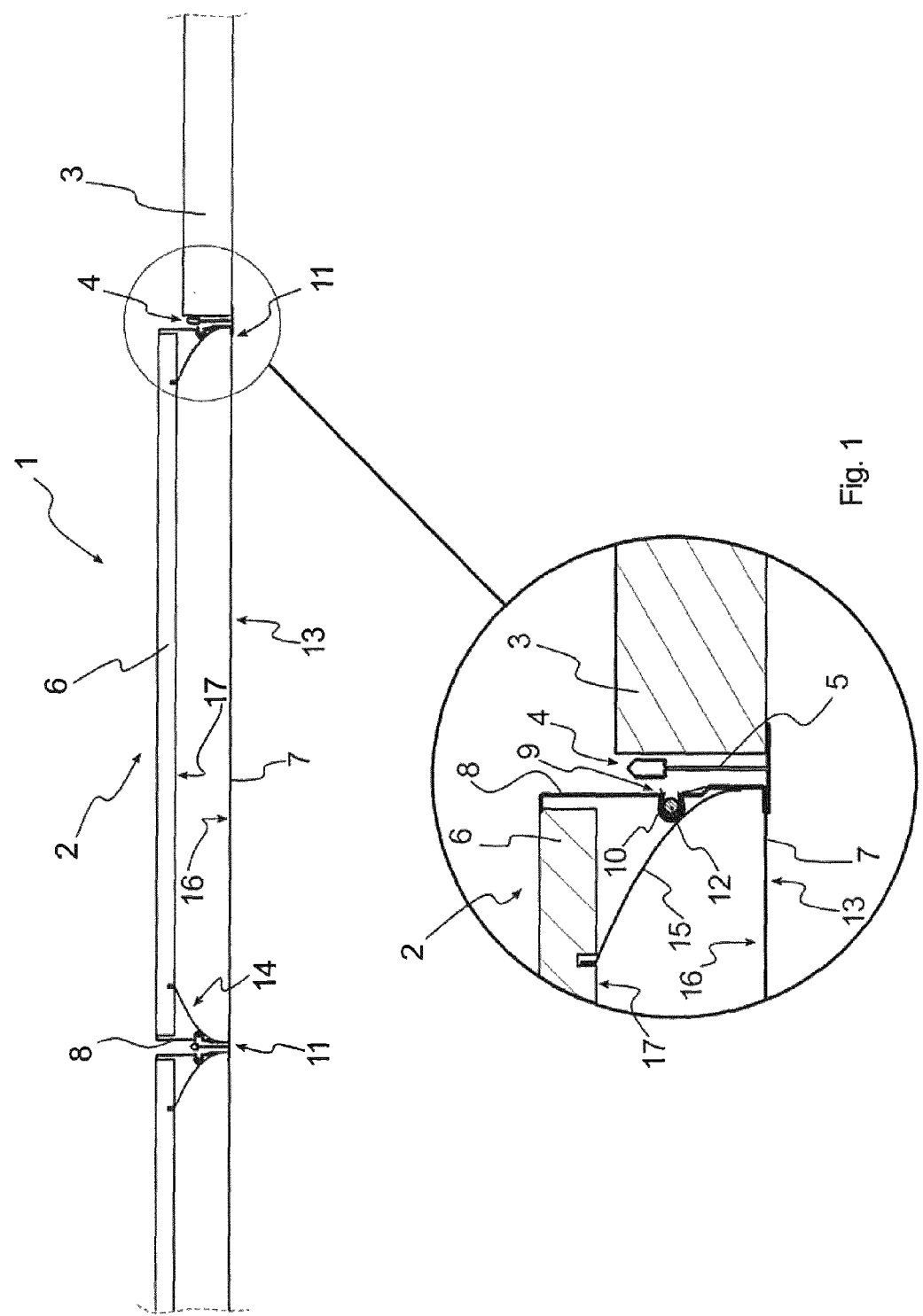
FIG. 1 is a cross-sectional side view schematically illustrating an embodiment of the inventive sound absorbing module.

FIG. 1 is a cross-sectional side view of a part of a suspended ceiling 1 in accordance with the present invention. The shown embodiment of the suspended ceiling comprises inventive sound absorbing modules 2 as well as conventional ceiling tiles 3.

The sound absorbing modules 2 and the ceiling tiles 3 are supported by a grid of profiles 4 forming a supporting structure. The grid of 4 profiles may be of any conventional kind and may as in the shown example comprise inverted T-profiles 5.

Each inventive module 2 comprises a sound absorbent element 6, which preferably is a porous absorber material. The sound absorbent element 6 may be made of mineral wool material, such as stone wool material or glass wool material, but also other porous absorber material may be used. The sound absorbent element 6 may have a thickness of at least 15 mm. The sound absorbent element 6 may be a conventional ceiling tile having a painted surface 17.

The sound absorbing module 2 further comprises a front cover 7, which is arranged at a distance from the sound absorbent element 6. The front cover 7 comprises a glass fibre material. Alternatively, the front cover may comprise a porous type material, such as fibres material (natural fibres, man-made fibres), yarn, fabric structures (knitted fabrics, woven fabrics, nonwoven fabrics) or compound fabric structures.

The front cover 7 is arranged at said distance from the sound absorbent element 6 by means of a distance providing means, which in the shown embodiment is in the form of a frame 8, which supports the sound absorbent element 6 and which is adapted for mounting said front cover 7.

A means 9 is provided for slack free mounting of the front cover 7.

The slack free mounting has benefits not only to the aesthetic appearance, but also to provide possibility to membrane resonance in the front cover 7.

Such a slack free mounting may be provided by gluing the front cover 7 against the frame 8, but it may also be done by mechanical fastening of the front cover 7 to the frame 8 or to any other distance providing means between the sound absorbent element 6 and the front cover 7. In another embodiment the front cover may be fastened to the sound absorbent element 6, where distance providing means function as a stretching element, which stretches the front cover to provide a slack free front cover at a distance from the sound absorbent element.

In the shown embodiment, the means 9 for slack free mounting comprises horizontal grooves 10 arranged in opposing sides 11 of the frame 8. The front cover 7 is attached to the frame 8 by means of rods 12 being pressed into the grooves 10.

When mounting the front cover 7, a first edge portion of the same is arranged over a first of said grooves 10 and subsequently a first of said rods 12 is pressed into the first groove 10 thereby attaching said first edge portion to the frame 8. The front cover 7 is then wrapped around the frame 8 such that it forms a front surface 13 of the module 2 and a second edge portion is arranged over a second of said grooves 10. By pressing a second of said rods 12 into the second groove 10, said second edge portion is attached to the frame 8 simultaneous as the front cover 7 is being stretched.

The provision of a front cover arranged at a distance from the sound absorbent element means that the surface 17 of said sound absorbent element will not be visible from below. Even though a conventional ceiling tile with a painted surface 17 may be used as a sound absorbent element, there is no need to make said surface 17 planar or to provide it with a laminate and/or a layer of paint. In fact, it may be an advantage to make said surface 17 non-planar, and by not laminating said surface, the need of applying glue or adhesive to the surface is eliminated which may have a positive effect on the flame-spread characteristics of the inventive sound absorbing module.

Figure 2A:
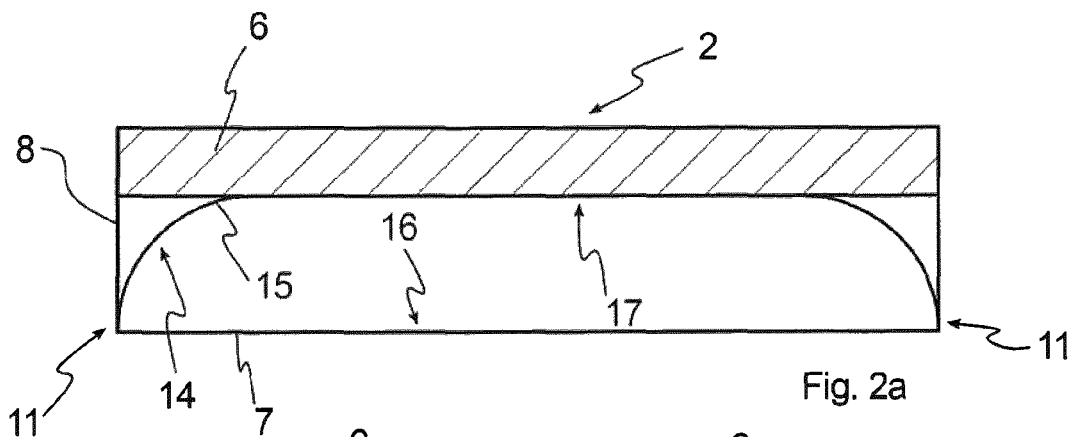
FIGS. 2a and 2b are cross-sectional side views schematically illustrating other embodiments of the inventive sound absorbing module.
Figure 2B:
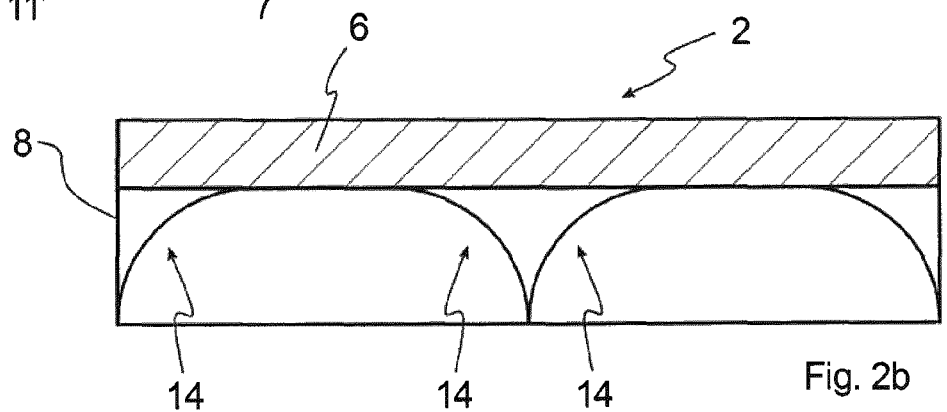

The sound absorbing module 2 may further comprise at least one diffraction element 14 arranged in the space defined between the sound absorbent element 6 and the front cover 7. The one or more diffraction elements 14 are provided to break up and scatter sound waves to thereby increase the probability for absorption thereof by the sound absorbent element 6. In one embodiment the diffraction elements 14 may be arc shaped baffle walls 15 forming an arc extending from an inner surface 16 of the front cover 7 towards a surface 17 of the sound absorbent element 6. In the shown embodiment, such arc shaped baffle walls 15 are arranged at opposing sides 11 of the sound absorbing module 2, which also is schematically shown in FIG. 2a. Even though the diffraction elements 14 cover a part of the surface 17 of the sound absorbent element 6, an improvement in absorption coefficient (diffuse) is provided with such an arrangement. In other embodiments one or more diffraction elements 14 may also be arranged distributed over the area of the sound absorbing module 6, as is shown in FIG. 2b. The diffraction elements 14 arranged along the sides 11 of the sound absorbent element 6 may be configured to engage with the frame 8 or any other distance providing element, while diffraction elements 14 arranged at a distance from the frame 8 or any other distance providing element may be fastened by mechanical and/or adhesive engagement with the sound absorbent element 6. In one embodiment, where the sound absorbent element 6 is made of a mineral wool material, the diffraction elements 14 may comprise projections adapted to be inserted or pressed directly into the mineral wool material.

It has unexpected been found that the sound absorbing behaviour of the sound absorbing module 2 is highly dependent on the flow resistance of the front cover 7, and the front cover 7 of the inventive sound absorbing module 2 has a flow resistance within the range of 200 to 800 Pas/m.

Figure 5:
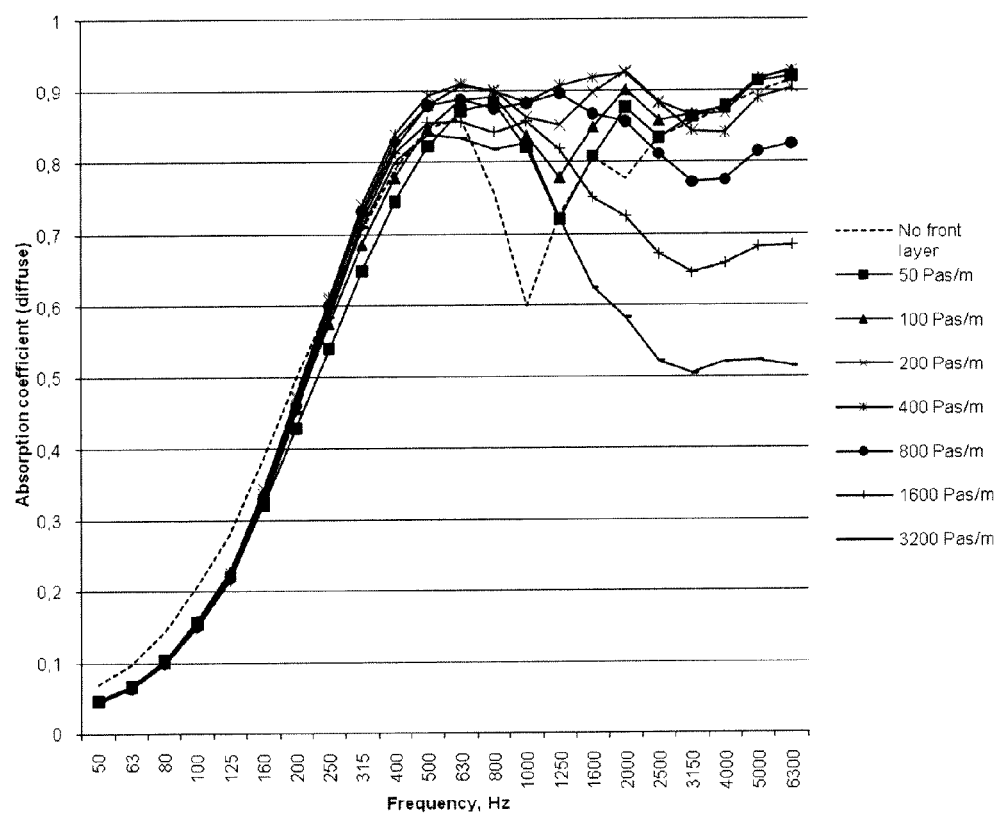
FIG. 5 is a graph showing the absorption coefficient (diffuse) as a function of frequency, Hz, for sound absorbing modules with front cover having different flow resistance.

In FIG. 5 is a graph showing the absorption coefficient at different frequencies for sound absorbing modules having front covers with different flow resistance. The flow resistance has been varied from 50 Pas/m to 3200 Pas/m. As may be seen from the graph, too low flow resistance increases the drop around 1250 Hz and too high flow resistance decreases the absorbing efficiency at high frequencies. An important area of frequencies to take under consideration when optimizing a sound absorbing module is the frequencies of 125 to 4000 Hz, even more the range of 250 to 2000 Hz, which is the information carrying part or speech, especially in an office environment.

When the graph of FIG. 5 was produced, the distance between the front cover 7 and the sound absorbent element 6 was 45 mm, the sound absorbent element was 15 mm thick and had a density of 55 kg/m$^3$.

Thus, the inventive sound absorbing module having a flow resistance within the range of 200 to 800 Pas/m, even more so within the range of 300 to 500 Pas/m, exhibits a maximized absorption coefficient.

As stated above, the front cover may be of a porous type, and in one embodiment it is a glass fibre fabric. The front cover may also be a sheet of cloth, or any other type of sheet as long as it is porous and has a flow resistance within the range of 200 to 800 Pas/m, even more so within the range of 300 to 500 Pas/m. However, the use of an inorganic material, such as a glass fibre fabric, has advantages of being fireproof, as it is a non-inflammable material.

In another embodiment the sound absorbing behaviour is even further maximized by the distance between the sound absorbent element and the front cover. According to this embodiment the distance may be within the range of 20 to 60 mm, and in another embodiment it may be 30 to 50 mm.

Figure 6:
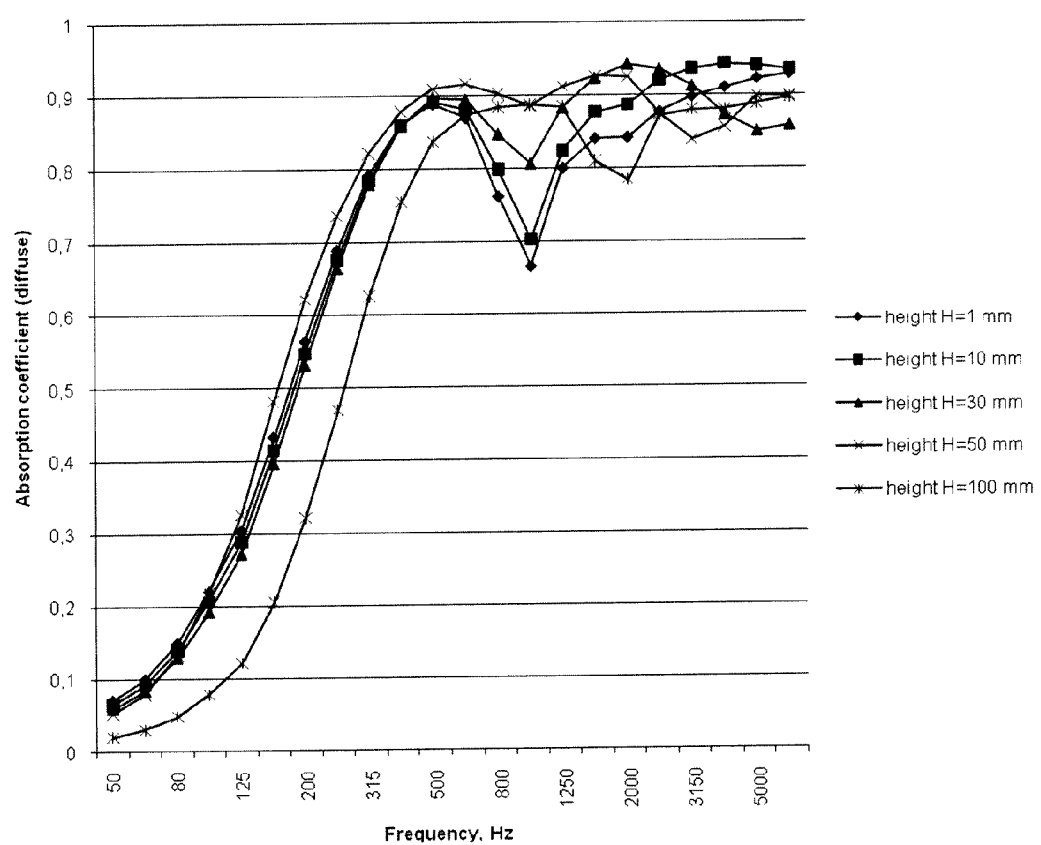
FIG. 6 is a graph showing the absorption coefficient (diffuse) as a function of frequency, Hz, for sound absorbing modules with different distances between the sound absorbent element and the front cover.

In FIG. 6 is a graph showing the absorption coefficient at different frequencies for sound absorbing modules where the distance between the front cover and the sound absorbent element has been varied. The distance has been varied from 1 mm to 100 mm. As may be seen from the graph, a too small distance increases the drop around 1250 Hz and a too long distance decreases the absorbing efficiency up to 500 Hz and then also at higher frequencies around 2000 Hz. Again the important area of frequencies to take under consideration when optimizing a sound absorbing module is the frequencies of 125 to 4000 Hz, even more the range of 250 to 2000 Hz, which is the information carrying part or speech within an office.

When the graph of FIG. 6 was produced the flow resistance of the front cover was 400 Pas/m, the sound absorbent element was 15 mm thick and had a density of 55 kg/m$^3$.

It has also been found that the sound absorbing behaviour of the sound absorbing module may be further maximised by the surface density of the front cover, and according to a yet another embodiment of the invention, the surface density of the front cover is above 100 g/m$^2$, more preferably above 150 g/m$^2$ and most preferably above 200 g/m$^2$.

Figure 7:
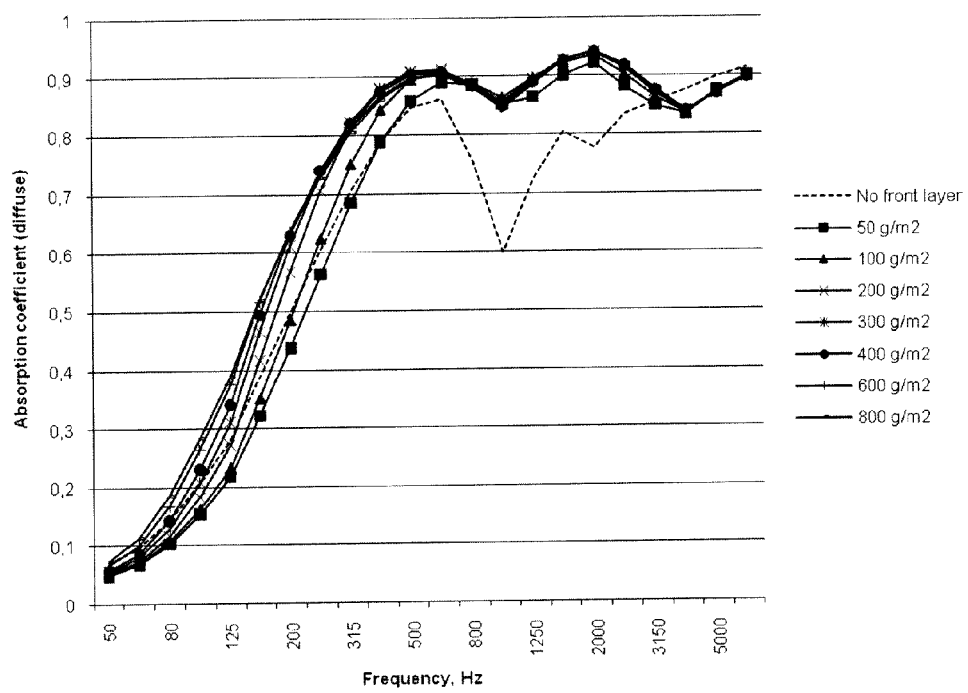
FIG. 7 is a graph showing the absorption coefficient (diffuse) as a function of frequency, Hz, for sound absorbing modules with front cover having different surface density.

In FIG. 7 is a graph showing the absorption coefficient at different frequencies for sound absorbing modules having front covers with different surface densities. The surface density has been varied from 50 g/m$^2$ to 800 g/m$^2$. As may be seen from the graph, the absorbing efficiency in the important area of frequencies, that is 125 to 4000 Hz, is improved compared to the case of no front cover when the surface density of the front cover is above 100 g/m$^2$. In the example shown in the graph, a surface density above 300 g/m$^2$ adds little to nothing to any additional improvement of the absorption efficiency in the relevant area of frequencies.

When the graph of FIG. 7 was produced, the front cover had a flow resistance of 400 Pas/m the distance between the front cover and the sound absorbent element was 40 mm; and the sound absorbent element was 15 mm thick and had a density of 55 kg/m$^3$.

Thus, the inventive sound absorbing module having a front cover with a surface density above 100 g/m$^2$, more preferably above 150 g/m$^2$ and most preferably above 200 g/m$^2$, exhibits a further maximized absorption coefficient.

Figure 3:
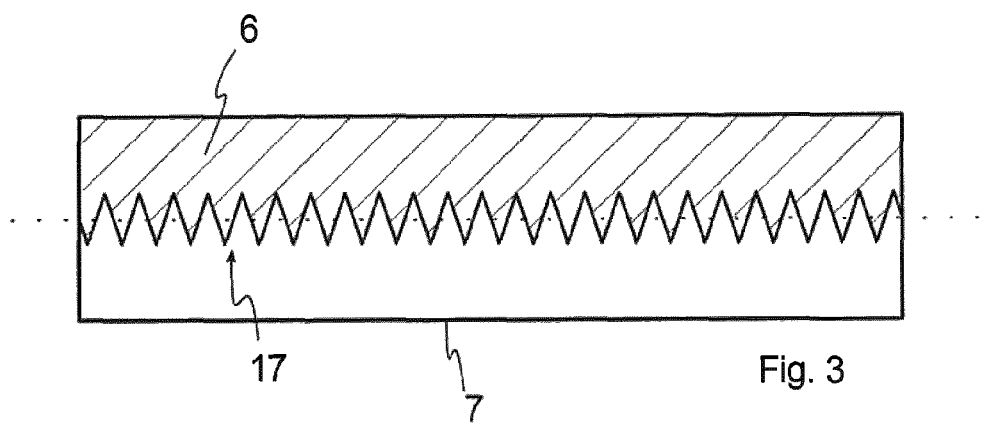
FIG. 3 is a cross-sectional side view schematically illustrating an alternative embodiment of the inventive sound absorbing module.

In yet another embodiment, the sound absorbent element may have a non-planar surface facing said front cover. As shown in FIG. 3 the sound absorbent element 6 may have a saw-tooth shaped surface 17, but it may also be other non-planar type surfaces, such as an undulated surface or have an irregular shape. This will provide a larger sound absorbent surface, and also increasing the absorption of sound waves in different incoming angles. In such embodiments the distance between the sound absorbent element 6 and the front cover 7 corresponds to the mean distance illustrated as a dashed line 7 in FIG. 3. The mean distance is within the range of 20 to 60 mm, preferably within the range of 30 to 50 mm.

Figure 4:
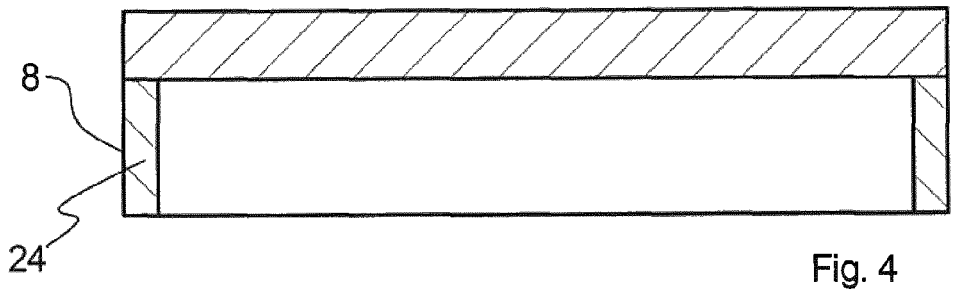
FIG. 4 is a cross-sectional side view schematically illustrating yet another alternative embodiment of the inventive sound absorbing module.

In even another embodiment shown in FIG. 4, the frame 8 or any other distance providing element may be lined with sound absorbent material 24, which also contributes to a larger sound absorbing surface as well as a different orientation of absorbent surface for incoming sound waves as well as scattered sound waves. When the frame or any other distance providing element is lined with sound absorbent material 24, any optional one or more diffraction elements may be arranged at a distance from the frame 8 or any other distance providing elements.

In all embodiments of the sound absorbing module according to the invention, the space provided by distance 5 between the sound absorbent element and the front cover may be used for different types of installations, such as electrical installations (sensors, loudspeakers, etc) and/or mechanical installations (ventilation devices, such as air conditioning means, means for supply air or exhaust air, etc).

As stated above, the sound absorbing modules according to the embodiments above are to be arranged into a suspended ceiling.

The suspended ceiling comprises the sound absorbing modules according to the embodiments above, optionally additional conventional ceiling tiles and a grid of profiles, most often comprised of inverted T-profiles forming a grid, which is adapted to support the sound absorbing modules. Seen from below, the suspended ceiling forms a two-dimensional visible ceiling surface.

When mounted, the grid of profiles may visible seen from below, but may also be, at least partly, concealed, or even totally concealed. The grid profiles may also be shaped to support sound absorbing modules of other shapes than rectangular, which is the most common shape, it may also be in the shape of a polygon, such as a triangle, a quadrilateral or a pentagon, etc.

The sound absorbing modules are, in one embodiment, rectangular comprising four sides, wherein each side is adapted to engage with the profile of the grid in the suspended ceiling arrangement. Alternatively, as mentioned above, the sound absorbing modules may for example be in the shape of a polygon, such a triangle, a quadrilateral or a pentagon, etc.

In one embodiment the sound absorbing modules are demountable from the suspended ceiling, and in may also be securely kept in position in the event of voluntary or involuntary forces being applied to them.

The present invention has mainly been described above with reference to a few embodiments. However, as is readily appreciated by a person skilled in the art, other embodiments than the ones disclosed above are equally possible within the scope of the invention, as defined by the appended patent claims. For example, it is noted that even though the present inventive concept has been described in relation to a flat suspended ceiling which is substantially in parallel with either a main ceiling or a floor of a room, it is equally applicable to inclined suspended ceilings which form an angle with the main ceiling or the floor.

Next, a suspended ceiling 1 comprising the inventive sound absorbing modules 2 will be described with reference to FIG. 8. Even though the present embodiment is described in relation to a flat suspended ceiling, which is substantially in parallel with either a main ceiling or a floor of a room, the inventive concept is equally applicable to multilevel or inclined suspended ceilings which form an angle with the main ceiling or the floor.

Figure 8:
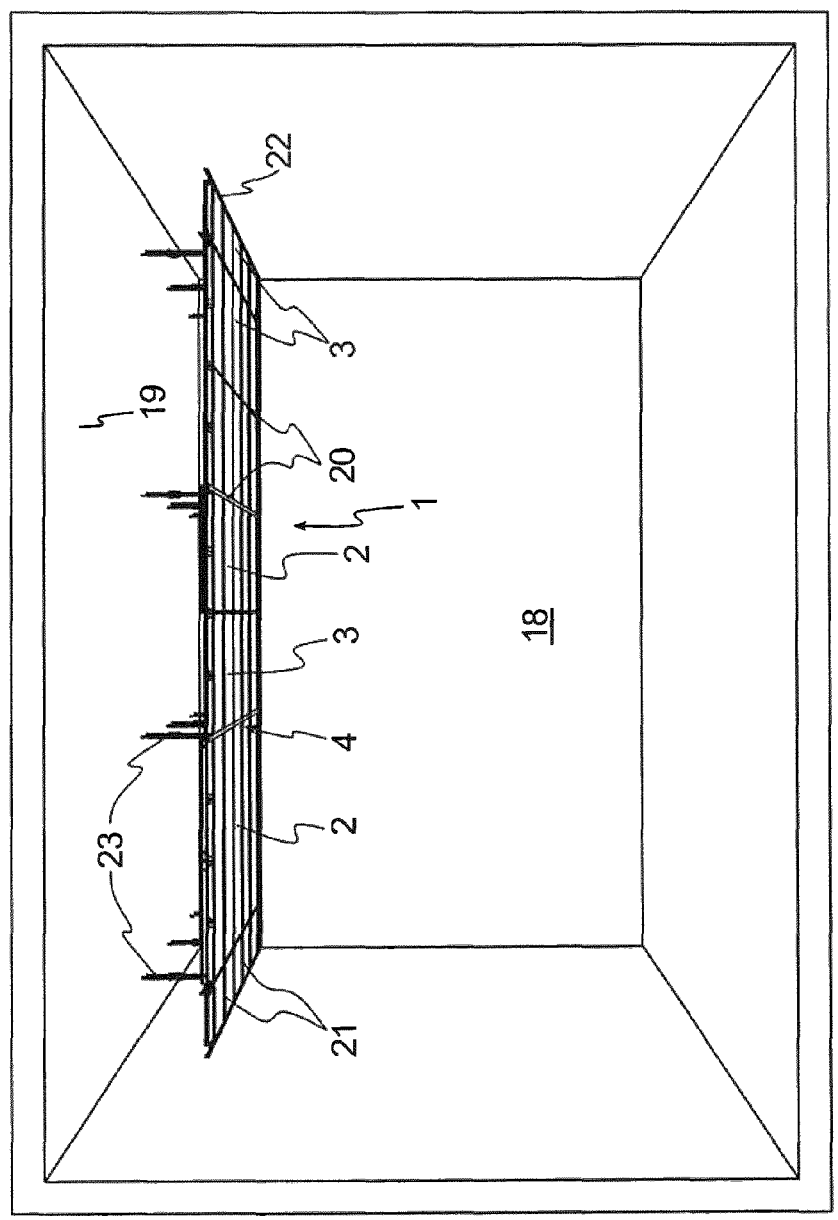
FIG. 8 is a perspective view schematically illustrating a suspended ceiling comprising a plurality of ceiling tiles of the type according to the invention and a grid of T-profiles.

FIG. 8 is a schematic perspective view illustrating a room 18 with a suspended ceiling 1 comprising a plurality of inventive sound absorbing modules 2, a plurality of conventional ceiling tiles 3 and a grid of profiles 4, as seen obliquely from below.

Each sound absorbing module 2 may be constructed as the sound absorbing module described above with reference to FIG. 1. The suspended ceiling 1 is mounted underneath a main ceiling 19 of the room 18, thereby forming a two-dimensional visible ceiling surface as seen from below.

When mounted, the grid of profiles 4 comprised in the suspended ceiling 1 may be at least partly concealed.

The grid of profiles 4 is a supporting structure for the sound absorbing modules 2 and the ceiling tiles 3, and comprises profiles in the form of main runners 20 as well as cross runners 21. A first set of main runners 20 may be suspended in the main ceiling 19, thereby supporting the grid of profiles 4, while a second set of main runners 20 may be non-supported in the same. Moreover, the first set may extend across several sound absorbing modules 2 or ceiling tiles 3 while the second set may comprise several segments, whereby each segment extends along the adjacent side edges of one pair of neighbouring sound absorbing modules 2 and/or ceiling tiles 3.

The cross runners 21 are provided at right angles to the main runners 20 and are connected to the same at a discrete set of locations. Thereby, the main runners 20 and the cross runners 21 form a grid-like structure which is adapted to support sound absorbing modules 2 and ceiling tiles 3 of a rectangular shape. The grid of profiles 4 also comprises wall runners 22 as is well-known to a person skilled in the art. It is also understood that the overall geometry of the profiles may vary. For instance, the profiles may be curved, horizontally and/or vertically, and may consequently be adapted to support sound absorbing modules and ceiling tiles of other shapes. For example, a sound absorbing module or a ceiling tile may be in the shape of a polygon, such as a triangle, a quadrilateral or a pentagon, etc.

According to the present embodiment, the grid of profiles 4 forms frames in the shape of inner rectangular frames and outer rectangular frame portions into which the sound absorbing modules 2 and ceiling tiles 3 are to be inserted. The outer rectangular frames are adapted to support perimeter tiles of the suspended ceiling 1. The perimeter tiles are also partly supported by the wall runners 22.

The perimeter tiles of the suspended ceiling 1 is in the shown embodiment formed by conventional ceiling tiles 3, since conventional ceiling tiles may easily be cut in order to adapt the suspended ceiling to the size of the room.

The sound absorbing modules 2 are arranged in two rows in the inner rectangular frames of the grid of profiles 4. A first set of sound absorbing modules 2 having a first dimension is arranged in a first row, and a second set of sound absorbing modules 2 having a second dimension is arranged in a second row. The remaining inner rectangular frames support conventional ceiling tiles 3 of uniform dimension.

The suspended ceiling 1 may comprise inventive sound absorbing modules 2 and an optional number of conventional ceiling tiles 3. The sound absorbing modules 2 may be mixed with the conventional ceiling tiles 3 according to any suitable pattern. The perimeter tiles may as stated above be formed by conventional ceiling tiles 3. A suspended ceiling 1 may further comprise technical tiles, that is tiles comprising and/or adjoining technical installations. Such technical tiles often have to be cut in order to adapt to the technical installation, and the technical tiles may thus be formed by conventional ceiling tiles. Non-limiting examples of such technical installations may be ventilation ducts, lightning devices or pillars.

The sound absorbing modules of the suspended ceiling may be designed such that they have an essential identical appearance as the conventional ceiling tiles when viewed from below. This may be achieved by choosing a suitable structure and colour of the front cover of the sound absorbing module in view of the front surface of the conventional ceiling tile.

The grid of profiles 4 is suspended by hangers 23 such as hanger wires, rods, etc. An end portion of each hanger 23 may be provided with a hook and be inserted into a corresponding hole in a hanger clip which is provided in the main runner 20. Moreover, the length of each hanger 23 may be adjustable. The other end of the hanger 23 is fastened to a permanent structure of the room, that is the main ceiling 19 of the room 18, thereby upholding the suspended ceiling 1.

According to the present embodiment, each of the profiles 20, 21 is an inverted T-profile, or a tee, thereby having a cross-section in the form of an inverted T. Thus, each of the profiles 20, 21 has a central web and two flanges which protrude to an equal extent from a lower part of the web in two opposite horizontal directions (not shown). The flanges are adapted to support the sound absorbing modules 2 and the ceiling tiles 3. A non-limiting example of a thickness of each of the flanges is 1.1 mm. The central web may optionally comprise a bulb, e.g. for reinforcing the T-profile. Preferably, the profiles are comprised of a light-weight material. For example, the material may be a metal such as steel or a sheet metal. Alternatively, the material may be a rigid plastic, a light metal, such as aluminium, or similarly. The profiles according to the present embodiment are fairly rigid. However, it is equally conceivable to utilize resilient profiles which may further simplify the installation of the suspended ceiling 1.

According to an alternative embodiment, the profiles may comprise at least one of an L-profile, an H-profile, an I-profile and a Z-profile.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A sound absorbing module for a suspended ceiling, comprising:
    a sound absorbent element;
    a front cover, said front cover is arranged at a distance from the sound absorbent element such that a free space is defined between the sound absorbent element and the front element; and is air permeable with a flow resistance within the range of 200 to 800 Pas/m;
    a frame supporting said sound absorbent element and being adapted for mounting said front cover; and
    at least one diffraction element for breaking up and scattering sound waves, said at least one diffraction element being formed separate from said frame and being arranged in the free space defined between said sound absorbent element and said front cover, and said at least one diffraction element is arc shaped.

2. A sound absorbing module according to claim 1, wherein said front cover has a flow resistance within the range of 300 to 500 Pas/m.

3. A sound absorbing module according to claim 2, wherein said front cover comprises a glass fiber material.

4. A sound absorbing module according to claim 3, wherein said distance between said sound absorbent element and said front cover is within the range of 20 to 60 mm, preferably within the range of 30 to 50 mm.

5. A sound absorbing module according to claim 1, which further comprises means for slack free mounting of said front cover.

6. A sound absorbing module according to claim 1, wherein said sound absorbent element comprises mineral wool material.

7. A sound absorbing module according to claim 1, wherein said at least one diffraction element is an arc formed baffle wall arranged to form an arc extending from an inner surface of the front cover towards a surface of the sound absorbent element.

8. A sound absorbing module according to claim 1, wherein said at least one arc shaped diffraction element is an arc formed baffle wall arranged to form an arc extending from the sound absorbent element towards an inner surface of the front cover.

9. A sound absorbing module according to claim 1, wherein said sound absorbent element has a non-planar surface facing said front cover.

10. A sound absorbing module according to claim 1, wherein said frame being lined with sound absorbent material.

11. A suspended ceiling comprising:
    a sound absorbing module according to claim 1;
    and a grid of profiles forming a frame which engages said sound absorbing module.

12. A sound absorbing module according to claim 1, wherein the front cover comprises a glass fiber material.

13. A sound absorbing module according to claim 1, wherein said distance between said sound absorbent element and said front cover is within the range of 20 to 60 mm, preferably within the range of 30 to 50 mm.

\* \* \* \* \*